United States Patent [19]

Mertens

[11] Patent Number: 4,829,953
[45] Date of Patent: May 16, 1989

[54] DAMPING BLOCK DESIGNED IN PARTICULAR FOR MOUNTING AN ENGINE IN A MOTOR VEHICLE

[75] Inventor: Theobald Mertens, Mainz, Fed. Rep. of Germany

[73] Assignee: General Motors Corporation, Detroit, Mich.

[21] Appl. No.: 135,009

[22] Filed: Dec. 18, 1987

[30] Foreign Application Priority Data

Feb. 7, 1987 [DE] Fed. Rep. of Germany ....... 3703851

[51] Int. Cl.$^4$ ............................ F16F 1/52; B60K 5/12
[52] U.S. Cl. .................................. 123/192 R; 180/300;
    180/312; 267/140.1; 267/141.1
[58] Field of Search .................... 123/192 R; 180/300,
    180/312; 188/268; 267/140.1, 141, 141.1, 141.6,
    140.2, 140.3, 140.4

[56] References Cited

U.S. PATENT DOCUMENTS

| 2,162,714 | 6/1939 | Hamblin | 267/141.1 |
| 2,357,740 | 9/1944 | Hickin et al. | 267/141.1 |
| 2,459,741 | 1/1949 | Kubaugh | 267/140.2 |
| 2,600,090 | 6/1952 | Barber et al. | 267/140.1 |
| 4,151,822 | 5/1979 | Miura et al. | 123/192 R X |

FOREIGN PATENT DOCUMENTS 3512555 11/1985 Fed. Rep. of Germany.

Primary Examiner—Willis R. Wolfe
Attorney, Agent, or Firm—R. L. Phillips

[57] ABSTRACT

A motor vehicle engine mount has two inner bodies which are directed toward each other and form a gap therebetween. Each of these bodies is connected to the interior of a frame via rubber webs and a connecting piece rigidly attached to one of the inner bodies is held in a sliding manner on the other inner body via a slot and a locking screw in the position which becomes established in the loaded resting state.

5 Claims, 1 Drawing Sheet

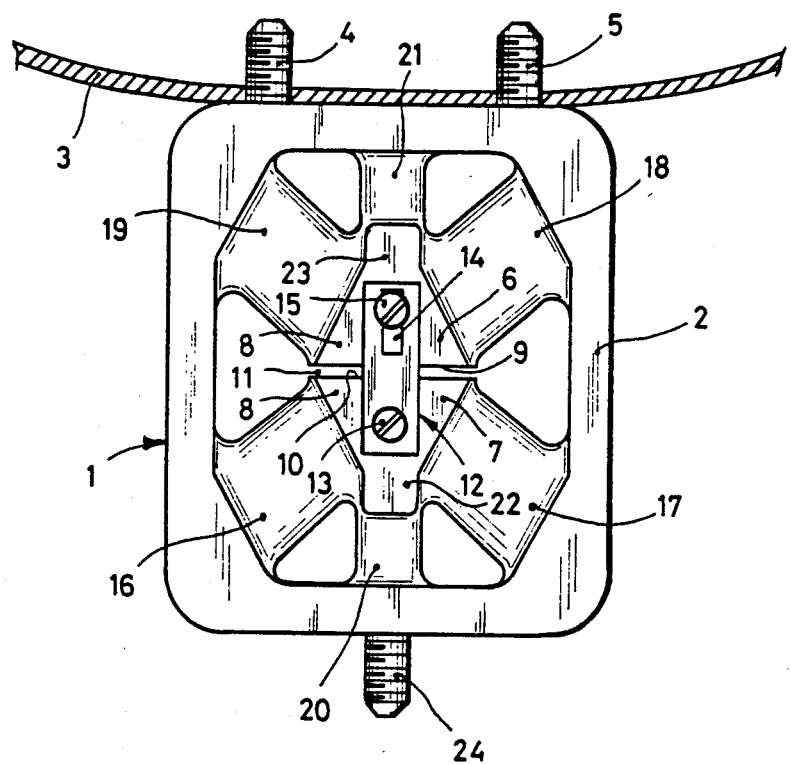

DAMPING BLOCK DESIGNED IN PARTICULAR FOR MOUNTING AN ENGINE IN A MOTOR VEHICLE

TECHNICAL FIELD

The present invention relates to a damping block for mounting an engine in a motor vehicle, comprising a rigid outer portion for connection to, e.g., the vehicle body, and a rigid inner portion connected to the such outer portion by elastic rubber webs for connection to, e.g., the engine, wherein the inner portion consists of two inner bodies arranged opposite each other at spaced locations, and connected to each other by means of an adjustable connecting piece for transmitting forces from one inner body to the other.

BACKGROUND OF THE INVENTION

The damping blocks used as a motor vehicle engine suspension have the task of absorbing the vibrations induced by the pavement in the front zone of the vehicle body, on the one hand, and of isolating the engine vibrations from the body, on the other hand. The vibrations of the front zone of the body are usually in the range of 15 Hz. In contrast, the vibrations occurring during the operation of the engine has a substantially higher frequency and can be manifested mainly as an acoustic disturbance. It is therefore important to reach a compromise between controlling the vibrations of the front zone of the body and the vibrations occurring during the operation of the engine when selecting the hardness and the damping ability of the damping blocks. If the rubber webs of the damping blocks are too hard, the vibrations of the front zone of the body will be almost completely suppressed, but the vibrations occurring during the operation of the engine will be introduced into the body too strongly and lead to a reduction in the acoustic comfort. Not even strong damping in the case of soft rubber webs will completely prevent the transmission of high-frequency vibrations into the body, so that it is not possible to optimize the noise and vibrations into the body, so that it is not possible to optimize the noise and vibration comfort by strong damping.

According to German DE-OS No. 35 12, 555, a damping block may be optimized by making its inner portion from two inner bodies which are screwed into each other by means of a connecting piece. If the inner portion is loaded by the weight of the engine when such a damping block is mounted, it will move downward with its two inner bodies relative to the outer portion. The upper inner body is then screwed upward by means of an adjusting square until it comes into contact with an intermediate layer of rubber in the upper damping block, thus becoming connected to the outer portion via the intermediate layer.

However, it is not possible to achieve load elimination from the upper intermediate rubber layer in the resting state of the engine with the above damping block, because the position in which the upper inner body reaches the rubber layer cannot be fixed in a reliable manner. Contact between the upper inner body and the rubber layer can only be inferred from the increasing torque during the screwing upward of the inner body. However, this can also in crease considerably for other reasons, e.g., due to tilting of the load to the suspension connection or to irregularities in the threads. Therefore, the desired noise comfort along with a high level of vibration comfort cannot be achieved even with such damping block.

SUMMARY OF THE PRESENT INVENTION

The present invention is directed to a damping body of the type specified in the introduction so that its upper rubber webs are stress-free due to the reliable possibility of adjustment in the loaded resting position, so that sufficient softness can be achieved for noise comfort without diminishing the vibration comfort.

This task is accomplished according to the present invention by the rubber webs being nondetachably connected to the two inner bodies and the connecting piece bridging over the inner bodies in a releasable manner.

Due to this possibility of disconnecting the connecting piece, the lower inner body is able to move away from the upper inner body completely freely in the loaded resting position, with the connecting piece disconnected, until an equilibrium of forces becomes established due to the elasticity of the rubber parts. The connecting piece is only connected thereafter, so that the two inner bodies are connected to each other in this position, in which the upper rubber webs are not subject to force in the resting state. As a result, it is possible to achieve good noise comfort even at a high level of vibration comfort.

The effect of the damping block according to the present invention is base on the fact that only the soft spring rate of the lower rubber webs acts at least with respect to the high-frequency vibrations generated during the engine operation. As a consequence of this, the vibrations generated during operation are scarcely transmitted into the body. However, the upper inner part with its rubber webs comes into action against low-frequency vibrations in the front zone of the body because the engine seeks to yield in the upward direction to the vibrations in the front zone of the body, so that the rubber webs for the upper inner portion made of metal are subjected to pressure. This does not happen in the case of the conventional engine suspension; there, the inner portion made form metal is normally able to freely yield upward. According to the present invention, a doubled spring rate acts, against the great deflections which are typical for the vibrations of the front zone of the body, whereas only a soft spring rate will act against the vibrations generated during the engine operation, which have a lower amplitude.

The present invention is especially advantageous in the case of transverse mounted engines because the engine first moves upward during acceleration. Since the upper inner body now moves against the upper webs, the lower webs are not subjected to excessive tensile stress.

The connecting piece is of an especially simple design in the form of a strip which is attached in a nonsliding manner to one of the inner bodies and is adjustably attached to the other inner body by means of a slot and a locking screw introduced through the slot. In such a connecting piece, only the locking screws of the damping blocks need to be tightened after the engine has been mounted to positively achieve and to fix the optimal position of the opposite inner bodies. A subsequent adjustment is also possible in exactly the same manner if this position is no longer optimal from the viewpoint of the vibrations because of a change in the hardness of the rubber webs due to aging.

The damping block according to the present invention possesses especially good vibration and damping properties by the inner bodies preferably each having approximately the shape of an isosceles trapezium, arranged with their longer base lines directed toward each other, forming a gap bridged over by the connecting piece and with a rubber web extending from each arm to the outer portion.

A further rubber web leading symmetrically to the outer portion between the other two rubber webs from the shorter base lines opposite the gap contributes to a reduction of the shear stress of the rubber webs according to another advantageous embodiment of the present invention.

The inner bodies, each with an extension directed symmetrically outward between the said arms on their shorter base lines, from which extension the further rubber web leads to the said outer portion, contributes to an increase in the strength of the said damping block.

These and other objects, advantages and features of the present invention will become ore apparent from the following description and drawing inn which:

The sole FIGURE is a side view of the preferred embodiment of a motor vehicle engine mount constructed according to the present invention.

The damping block 1 shown in the figure has a frame-like outer portion 2 made of metal, from which two threaded bolts 4, 5 welded thereto extend upward for fastening to a vehicle body 3. Two inner bodies 6, 7 made of metal, which together form an inner portion 8, are arranged inside the outer portion 2. Each of the two inner bodies 6, 7 have approximately the shape of an isosceles trapezium whose longer base lines 9, 10 are directed toward each other, leaving a gap 11. The gap 11 is bridged over by a connecting piece 12 in the form of a strip attached to the lower inner body 7 by means of a screw 13 passed through a round hole. On the opposite side, the connecting piece 12 has a slot 14 through which a locking screw 15 is introduced into the upper inner body 6.

Rubber webs 16, 17 and 18, 19 lead from each of the surfaces forming the arms of the trapezium-shaped inner bodies 6, 7 to the outer portion 2, such rubber webs being rigidly attached to the said surfaces. A further rubber web 20, 21 which leads from the outer portion 2 to the blunt and of an upward or downward directed extension 22, 23 of the inner body 6, 7 is provided in the upward and downward directions between the rubber webs 16, 17 and 18, 19.

For connecting the inner portion 8 consisting of the inner bodies 6, 7 to an engine (not shown), a threaded bolt 24 is rigidly attached such as by a weld to the inner body 7 and extends downward in a sliding manner through the outer portion 2.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A motor vehicle engine mount comprising a rigid outer portion, a rigid inner portion connected to the outer portion by flexible rubber webs, said inner portion having two inner bodies which are opposite each other and spaced apart and which are connected to each other by an adjustable connecting piece for transmitting forces from one inner body to the other, characterized in that the rubber webs are connected non-releasably to the two inner bodies and the connecting piece includes adjustable securing means detachably bridging the inner bodies.

2. A motor vehicle engine mount according to claim 1, further characterized in that the connecting piece is a strip which is fixed non-slidably to one inner body and fixed adjustably on the other inner body by said adjustable securing means comprising a slot and a locking screw passing through the latter.

3. A motor vehicle engine mount according to claims 1 or 2, further characterized in that the inner bodies each have approximately the shape of an isosceles trapezium, which trapezia are arranged with their longer base lines directed towards each other, forming a gap bridged by the connecting piece and with a rubber web extending from each arm to the outer portion.

4. A motor vehicle engine mount according to claim 3, further characterized in that in each case an additional rubber web leads from the shorter base line opposite the gap to the outer portion, symmetrically between the other two rubber webs.

5. A motor vehicle engine mount according to claim 3, further characterized in that the inner bodies each have on their shorter base line an extension which is directed outwardly symmetrically between the webs loading from the respective inner bodies and from which extension an additional rubber web leads to the outer portion.

* * * * *